(12) United States Patent
Kochansky

(10) Patent No.: US 7,403,918 B2
(45) Date of Patent: Jul. 22, 2008

(54) INVESTMENT PORTFOLIO COMPLIANCE SYSTEM

(75) Inventor: Joseph M. Kochansky, New York, NY (US)

(73) Assignee: BlackRock Inc., New York, NY (US)

( * ) Notice: Subject to any disclaimer, the term of this patent is extended or adjusted under 35 U.S.C. 154(b) by 1380 days.

(21) Appl. No.: 10/086,769

(22) Filed: Mar. 1, 2002

(65) Prior Publication Data

US 2003/0167221 A1    Sep. 4, 2003

(51) Int. Cl.
*G06Q 40/00* (2006.01)
(52) U.S. Cl. .............................. 705/36; 705/35; 705/37
(58) Field of Classification Search .................. 705/36, 705/35
See application file for complete search history.

(56) References Cited

U.S. PATENT DOCUMENTS

| | | | |
|---|---|---|---|
| 5,210,687 A | 5/1993 | Wolfberg et al. | 364/408 |
| 5,563,783 A | 10/1996 | Stolfo et al. | 364/408 |
| 5,732,397 A | 3/1998 | DeTore et al. | 705/1 |
| 5,774,880 A | 6/1998 | Ginsberg | |
| 5,774,881 A | 6/1998 | Friend et al. | 705/36 |
| 5,784,696 A | 7/1998 | Melnikoff | 705/36 |
| 5,812,987 A | 9/1998 | Luskin et al. | 705/36 |
| 5,819,237 A | 10/1998 | Garman | 705/36 |
| 5,819,238 A | 10/1998 | Fernholz | 705/36 |
| 5,826,243 A | 10/1998 | Musmanno et al. | 705/35 |
| 5,857,176 A | 1/1999 | Ginsberg | |
| 5,893,079 A * | 4/1999 | Cwenar | 705/36 R |
| 5,911,135 A | 6/1999 | Atkins | 705/36 |
| 5,911,136 A | 6/1999 | Atkins | 705/36 |
| 5,924,082 A | 7/1999 | Silverman et al. | |
| 5,924,083 A | 7/1999 | Silverman et al. | |
| 5,940,809 A | 8/1999 | Musmanno et al. | 705/35 |
| 5,950,176 A | 9/1999 | Keiser et al. | |
| 5,978,778 A | 11/1999 | O'Shaughnessy | 705/36 |
| 5,999,918 A | 12/1999 | Williams et al. | 705/36 |
| 6,055,517 A | 4/2000 | Friend et al. | 705/36 |
| 6,061,662 A | 5/2000 | Makivic | 705/36 |
| 6,078,904 A | 6/2000 | Rebane | 705/36 |
| 6,085,175 A | 7/2000 | Gugel et al. | 705/36 |
| 6,122,635 A * | 9/2000 | Burakoff et al. | 707/102 |
| 6,249,775 B1 | 6/2001 | Freeman et al. | 705/36 |
| 6,275,814 B1 | 8/2001 | Giansante et al. | 705/36 |
| 6,292,787 B1 | 9/2001 | Scott et al. | 705/36 |
| 6,360,210 B1 | 3/2002 | Wallman | 705/36 |
| 6,393,409 B2 | 5/2002 | Young et al. | 705/37 |
| 6,405,179 B1 | 6/2002 | Rebane | 705/36 |
| 6,484,152 B1 | 11/2002 | Robinson | 705/36 |

(Continued)

FOREIGN PATENT DOCUMENTS

WO    WO 00/75821 A2 * 12/2000

*Primary Examiner*—Jagdish N Patel
(74) *Attorney, Agent, or Firm*—Edwards Angell Palmer & Dodge LLP

(57) ABSTRACT

A method is disclosed for determining whether a transaction involving a financial instrument is in compliance with investment objectives associated with an investment portfolio. The method includes the step of providing a rule pertaining to an investment objective, wherein the rule contains a reference to a dynamic database having one or more related entries. The method also includes the steps of applying the rule to an investment request regarding a transaction involving a financial instrument, referring to the dynamic database to incorporate each related entry into the rule, and determining whether the investment request complies with the rule.

26 Claims, 4 Drawing Sheets

U.S. PATENT DOCUMENTS

| | | | |
|---|---|---|---|
| 6,820,069 B1* | 11/2004 | Kogan et al. | 706/46 |
| 2002/0038273 A1* | 3/2002 | Wherry et al. | 705/36 |
| 2002/0059107 A1* | 5/2002 | Reich et al. | 705/26 |
| 2002/0082979 A1* | 6/2002 | Sands et al. | 705/37 |
| 2003/0117446 A1* | 6/2003 | Esposito-Ross et al. | 345/810 |

* cited by examiner

PORTFOLIO A

| SECURITY DESCRIPTION | CUSIP | COUPON | MATURITY | FACE | VALUE | YIELD | RATING | ALLOCATION |
|---|---|---|---|---|---|---|---|---|
| TREASURIES | | | | | | | | |
| Treasury Note (OTR) | 912827Z62 | 4.63 | 12/31/2002 | $100,000.00 | $103,500.00 | 4.54% | | |
| Treasury Note (OTR) | 912827X56 | 4.75 | 11/15/2008 | $100,000.00 | $102,650.00 | 4.66% | | |
| Treasury Bond (OTR) | 912827H12 | 5.25 | 11/15/2028 | $100,000.00 | $104,500.00 | 5.09% | | |
| | | | | $300,000.00 | $310,650.00 | | | 15% |
| MORTGAGES | | | | | | | | |
| FNMA | 3134653H9 | 6.85 | 7/23/2007 | $500,000.00 | $485,000.00 | 7.72% | AAA | |
| FHLMC | B04655658 | 7.25 | 6/12/2010 | $500,000.00 | $470,000.00 | 7.21% | AAA | |
| | | | | $1,000,000.00 | $955,000.00 | | | 45% |
| CORPORATES | | | | | | | | |
| (Industrial) | | | | | | | | |
| Georgia Power Company | 373334556 | 8.75 | 12/31/2018 | $100,000.00 | $101,995.00 | 6.19% | BBB | |
| Proctor & Gamble Company | 456659921 | 8.15 | 6/15/2019 | $100,000.00 | $126,264.00 | 6.14% | AAA | |
| Nabisco Incorporated | 629752Z45 | 6.15 | 2/15/2011 | $200,000.00 | $220,000.00 | 4.50% | AAA | |
| (Technology) | | | | | | | | |
| Microsoft Corporation | 700987613 | 7.25 | 6/15/2020 | $200,000.00 | $205,100.00 | 5.75% | AAA | |
| Lucent Technologies Inc. | 786540012 | 6.55 | 12/31/2015 | $100,000.00 | $104,300.00 | 5.25% | AAA | |
| Cisco Systems Inc. | 898777564 | 6.75 | 2/15/2015 | $100,000.00 | $102,780.00 | 5.75% | AAA | |
| | | | | $800,000.00 | $860,439.00 | | | 40% |
| TOTAL ASSETS | | | | $2,100,000.00 | $2,126,089.00 | | | 100% |

FIG. 2

INVESTMENT PORTFOLIO COMPLIANCE SYSTEM

BACKGROUND OF THE INVENTION

1. Field of the Invention

The subject invention is directed to a system and method of using relational databases to perform instructed tasks, and more particularly, to a system and method of analyzing transactions involving financial instruments related to an investment portfolio in light of one or more investment objectives defined by an investor.

2. Background of the Related Art

Investment managers, and in particular, those who are responsible for managing the portfolios of large institutional investors, buy and sell fixed income securities and equities, based upon the investment objectives set forth by the investors. For example, a particular institutional investor may wish to restrict certain types of assets from its portfolio. In such an instance, the investor may instruct its portfolio manager not to purchase corporate bonds or equities from certain corporations or industry sectors. Alternatively, a particular institutional investor may have the desire to limit a certain percentage of its assets under management to certain types of fixed income securities. For example, an institutional investor may designate that not more than five percent of its assets under management should be invested in mortgage backed securities.

Investment objectives are generally conveyed from an investor to a portfolio manager in the form of a set of investment rules or guidelines. The investment rules are then used by the portfolio manager to develop compliance rules against which investment decisions or portfolios of investments are analyzed.

Compliance rules operate in two distinct ways. First, a compliance rule can effect a particular investment decision, such as the decision to purchase a large quantity of Treasury notes for inclusion in a particular portfolio. This decision could be governed by one or more compliance rules that would influence the decision before the investment is made. Such a rule is commonly referred to as a "front end" compliance rule. Alternatively, a compliance rule could effect the composition of a particular portfolio, such as by requiring a portfolio manger to sell a quantity of a particular type of fixed income security. For example, as a result of a change in interest rates, a compliance rule may be employed to instruct a portfolio manager to reduce the quantity of a certain class of Treasury notes within a particular portfolio. Such a compliance rule would effect the portfolio as a whole, rather than a particular investment decision, and is therefore commonly referred to as a "back end" compliance rule.

Compliance rules, whether related to back-end or front-end compliance, have been used by portfolio managers in computerized portfolio management systems. In the past, compliance rules set forth by institutional investors have been translated into computer readable statements. Such statements are then used to instruct a computer system to monitor investment decisions and the composition of portfolios as a whole, and to inform portfolio mangers whether particular investment decisions or portfolios of investments are in compliance with the investment objectives of particular investors.

In many instances, the computer readable statements used by portfolio management systems are extremely long, in that they contain a great number of characters and/or symbols representing the investment objectives of an investor. For example, a statement might include a long list of company names or types of investments that a particular investor desires to restrict from its portfolio. In such an instance, the computer programmer is faced with the time consuming task of creating such a lengthy statement. In addition, should the investor want to modify the investment objective, such as by adding or deleting certain types of investments that it desires to restrict from its portfolio, the computer programmer would need to edit the actual compliance rule dealing with such an objective. Such a task is time consuming, as well as disruptive to the effective management of the portfolio. It would be beneficial therefore, to provide a system and method for generating and utilizing compliance rules in a more efficient and cost effective manner.

SUMMARY OF THE INVENTION

The subject invention is directed to a method of determining whether a transaction involving a financial instrument is in compliance with investment objectives associated with an investment portfolio. The method includes the step of providing at least one rule pertaining to an investment objective. The at least one rule preferably includes a reference to a dynamic database or list that contains a plurality of related entries. The method further includes the steps of applying the at least one rule to an investment request regarding a transaction involving a financial instrument and referring to the dynamic database or list to incorporate each related entry contained therein into the at least one rule. The method also includes the step of determining whether the investment request complies with the at least one rule.

The subject invention is also directed to a method of determining whether the composition of an investment portfolio is in compliance with investment objectives. The method includes the step of providing at least one rule pertaining to an investment objective. The at least one rule preferably includes a reference to a dynamic database or list that contains a plurality of related entries. The method further includes the steps of applying the at least one rule to the investment portfolio and referring to the dynamic database or list to incorporate each entry contained therein into the at least one rule. The method also includes the step of determining whether the investment portfolio complies with the at least one rule.

The subject invention is further directed to a system for determining whether a transaction involving a financial instrument is in compliance with investment objectives associated with an investment portfolio. The system includes a memory storing at least one rule pertaining to an investment objective. The at least one rule preferably includes a reference to a dynamic database or list that contains a plurality of related entries. The system also includes a processor which communicates with the memory and is configured to apply the at least one rule to an investment request regarding a transaction involving a financial instrument by referring to the dynamic database or list. The system further includes means for incorporating each entry contained in the dynamic database into the at least one rule and for determining whether the investment request complies with the at least one rule.

The subject invention is further directed to a system for determining whether the composition of an investment portfolio is in compliance with investment objectives. This system includes a memory storing at least one rule pertaining to an investment objective. The at least one rule includes a reference to a dynamic database or list that contains a plurality of related entries. The system also includes a processor that communicates with the memory and is configured to apply the at least one rule to the investment portfolio by referring to the dynamic database or list. The system further includes means for incorporating each entry contained in the dynamic database or list into the at least one rule and for determining whether the investment portfolio complies with the at least one rule.

In general, the subject invention is directed to a method of performing a task based on an instructional statement submitted to a computerized portfolio management system. This basic method includes the step of providing an instructional statement relating to the performance of a specified task, wherein the instructional statement includes a reference to a dynamic database containing a plurality of related entries. The method further includes the steps of accessing the dynamic database, incorporating each of the related entries in the dynamic database into the instructional statement, and applying the instructional statement to perform the specified task.

It is envisioned that the instructional statements can define a variety of different tasks relating to the management of a portfolio of financial instruments. For example, the instructional statement can define a compliance rule pertaining to an investment objective, and the application of the instructional statement would include the step of determining whether an investment request relating to a financial instrument is in compliance with an investment objective. Alternatively, the instructional statement can define spread pricing criteria relating to an investment in a financial instrument, and the application of the instructional statement would include the step of determining credit spread risk relating to the investment. In another instance, the instructional statement could define report generating criteria relating to a portfolio of financial instruments, and the application of the instructional statement would include the step of generating a portfolio report based upon the report generating criteria. In yet another instance, the instructional statement could define trade routing criteria relating to a transaction involving a financial instrument, and the application of the instructional statement would include the step of routing information relating to a transaction involving a financial instrument to designated parties interested in the transaction.

These and other aspects of the system and method of the subject invention will become more readily apparent to those having ordinary skill in the art from the following detailed description of the invention taken in conjunction with the drawings.

BRIEF DESCRIPTION OF THE DRAWINGS

So that those having ordinary skill in the art to which the present invention pertains will more readily understand how to make and use the method and system of the present invention, embodiments thereof will be described in detail herein below with reference to the drawings described herein below, wherein:

FIG. 2 is an exemplary portfolio of fixed income securities including Treasury Instruments, Corporate Bonds and Mortgage Backed Securities;

DETAILED DESCRIPTION OF PREFERRED EMBODIMENTS

Figure 1:
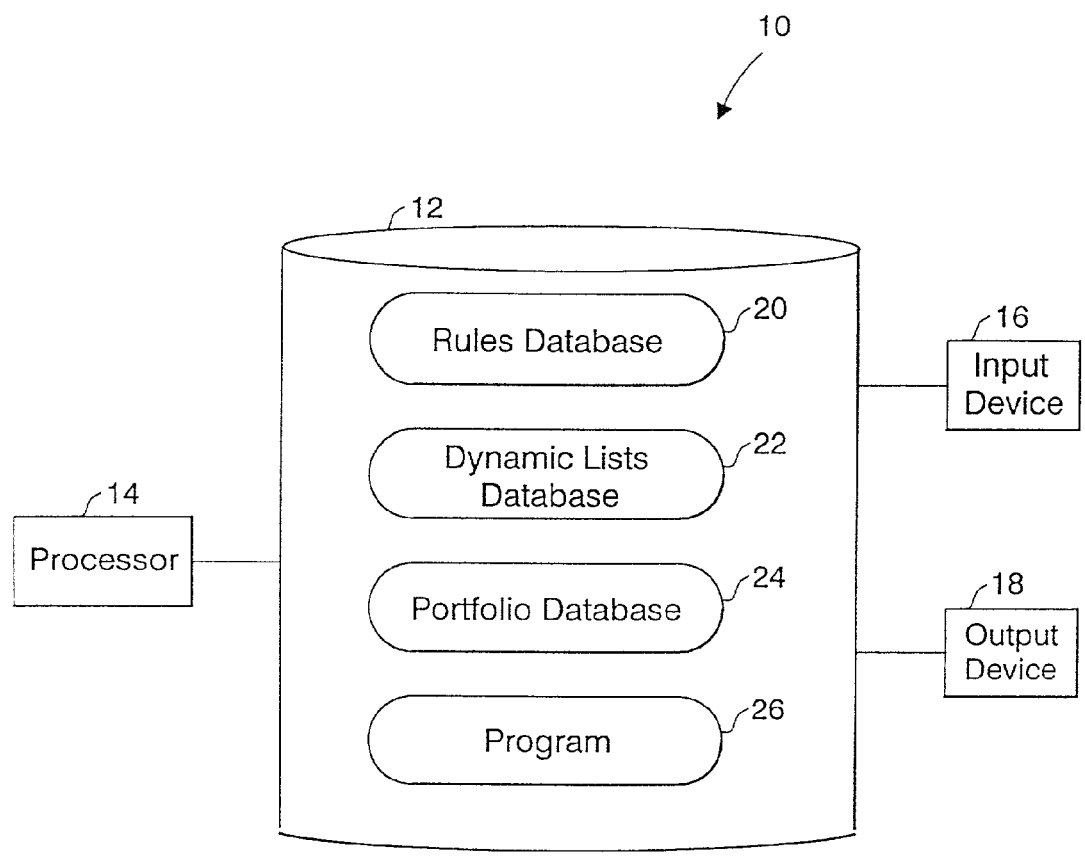
FIG. 1 is a schematic diagram depicting the core functional components of the computer-based compliance system of the subject invention.

Referring now to the drawings wherein like reference numerals identify similar elements or aspects of the system and method disclosed herein, there is illustrated in FIG. 1 a schematic representation of a computerized compliance system constructed in accordance with a preferred embodiment of the present invention and designated generally by reference numeral 10. Compliance system 10 is adapted and configured to evaluate and analyze investment requests and investment portfolios in view of a set of investment objectives and/or guidelines or compliance rules provided to a portfolio manager, agent or custodian by an investor.

Compliance system 10 includes a data storage device or memory 12 and a processor 14 which is operatively associated with the memory 12 for managing the flow of data throughput. A data input device 16 is operatively associated with the memory 12 and processor 14 for receiving data and instructions from a portfolio manager or other source of financial or investment information, and a data output device 18 is operatively associated with the memory 12 and processor 14 for reporting information to an interested party.

The memory 12 contains a plurality of cooperative relational databases. These databases include a rules database 20 which stores a multiplicity of front-end and back-end compliance rules or instructional statements. Such compliance rules may relate to, among other things, duration guidelines indicating a targeted duration for a portfolio, asset allocation guidelines setting forth eligible types of investments, credit agent criteria for financial instruments (e.g., ratings supplied by S&P or Moody's), restricted securities which may not be added to a portfolio and other investment practices.

Preferably, the rules database 20 includes one or more instructional statements or compliance rules or containing at least one reference to a dynamic list stored within a dynamic list database 22. The dynamic list database 22 contains a plurality of dynamic lists. Each dynamic list stored within the dynamic database 22 includes a plurality of related data entries containing one or more common characteristics. Each entry can be operatively incorporated by reference into a compliance rule referring to such a dynamic list by the processor 14, as explained in more detail hereinbelow. Preferably, the dynamic lists contained within database 22 may be easily modified and/or edited to add and/or delete entries therefrom using a graphical user interface with a data input device. Consequently, it is unnecessary to modify or edit a specific compliance rule referencing a modified dynamic list.

Memory 12 further contains a portfolio database 24 storing a plurality of investment portfolios each owned by an individual or institutional investor. Each portfolio includes a plurality of investments including, among other things, fixed income securities such as U.S. Treasury note, municipal, corporate or agency bond issues, and mortgage backed securities, money market instruments, equities, currencies and derivative instruments. An example of a portfolio of investments is illustrated in FIG. 2, and will be referred to periodically herein as Portfolio A. Memory 12 also stores a program 26 containing an instruction set written in a conventional computing language such as C++ or Java, for coordinating the interactive relationship between the memory 12, the processor 14, and the input and output devices 16, 18.

Figure 3:
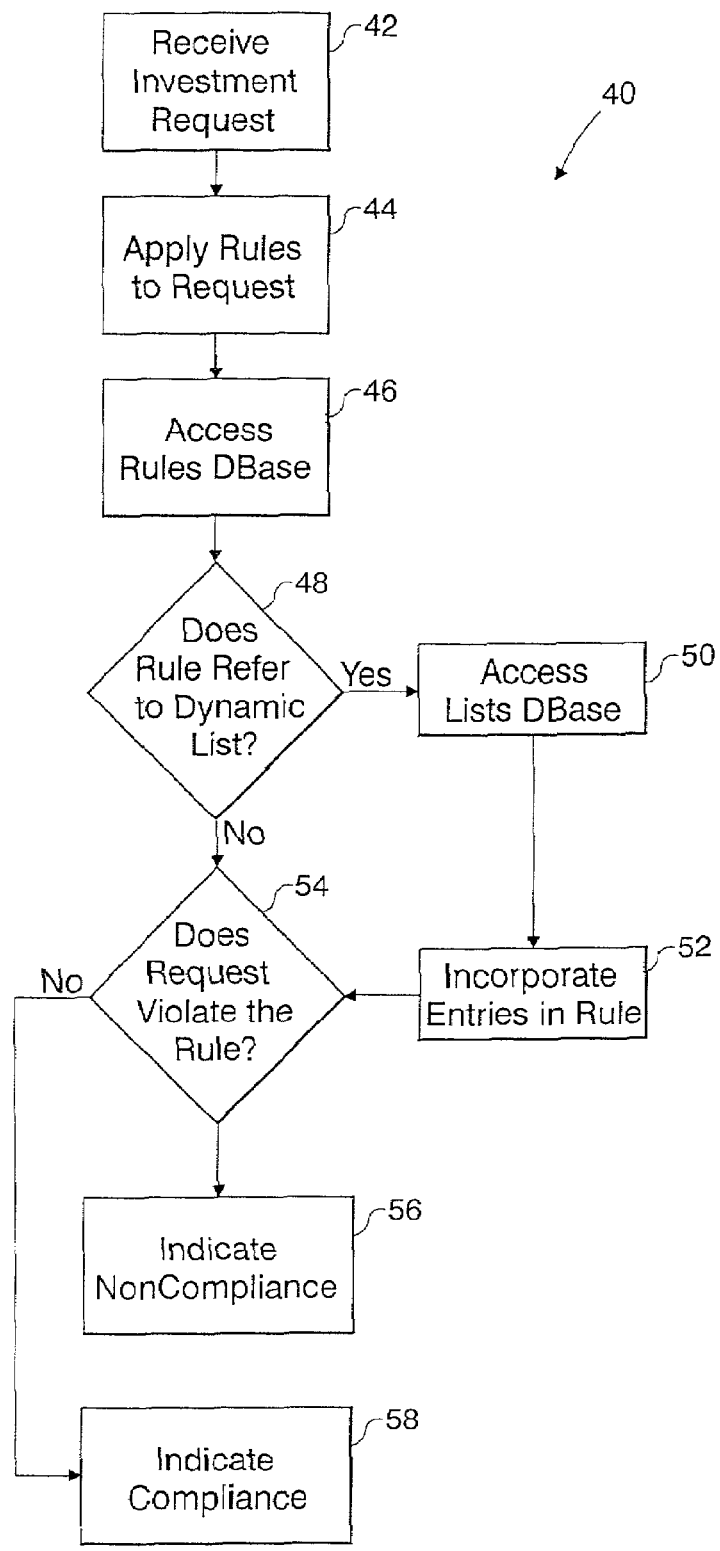
FIG. 3 is a flow chart illustrating the iterative process steps supporting a Front-End Compliance check based on a preferred embodiment of the subject invention.

Referring now to FIG. 3, there is illustrated a process flow chart 40 depicting operational steps employed in the method of the present invention to perform a front-end compliance check upon an investment request submitted by a portfolio manager or custodian of a portfolio of investments owned by a particular investor, such as Portfolio A of FIG. 2. The front-end compliance process 40 begins at step 42 where an investment request, is received by the system 10 through input device 16.

Investment Request 1

Purchase 5,000 BBB Rated Bonds of Philip Morris Corporation at 50,000 USD.

It is envisioned that the device for inputting and/or receiving data 16 can include any form of conventional data input device such as a keyboard, a touch screen, a mouse, a scanner, a voice activator or any other type of data transmission device ordinarily known in the art. The input device 16 may be hardwired or wireless. It is also envisioned that the input or reception of data may also be performed directly, remotely, manually or automatically.

At step 44 the processor 14 applies one or more compliance rules in database 20 related to Portfolio A to the investment request. It is envisioned that the application of the rule may be self-executed or manually executed by an interested party. This application of a compliance rule to a request is accomplished by accessing the rules database 20 at step 46. Preferably, each compliance rule in rules database 20 is written in a computer readable language as a data string representing a syntactic statement provided by the investor. Examples of syntactic statements defining front-end compliance rules related to Portfolio A can read as follows:

Rule 1 (Front-End Dynamic Compliance Rule)

Do Not Add Bond Issues From Any of the "Tobacco Companies" to Portfolio A.

Rule 2 (Front-End Static Compliance Rule)

Securities Rated BBB by S&P Cannot Exceed 10% of the Total Assets of Portfolio A.

In these examples, Rule 1 restricts the purchase of corporate bonds issued by cigarette manufacturers. Other such rules may restrict the purchase of securities issued by weapons manufacturers, liquor manufacturers, environmental polluters, casinos or certain municipalities. Rule 2 is based on asset allocation guidelines and credit criteria defined by the investor. Another dynamic rule could require that all transactions for a particular portfolio be executed through a set of preferred brokers that would be defined within a dynamic list. Such a list could be easily modified to add or delete brokers. In accordance with the subject invention, the syntactic statements are translated into a computer readable data string by a programmer.

At step 48 the processor 14 determines whether any of the front-end compliance rules related to Portfolio A contain a reference to a dynamic list stored within the lists database 22. The reference to the dynamic list is preferably in the form of a "List Name" contained in the data string representing the compliance rule, such as, for example, the list name "Tobacco Companies" contained in the Front-End Dynamic Compliance Rule set forth above and illustrated below in the dynamic list of Table 1.0.

TABLE 1.0

List Database

Tobacco Companies

B.A.T. Industries
Loews
Phillip Morris Corporation
U.S. Tobacco Incorporated

With continuing reference to FIG. 3, if the answer to the inquiry at step 48 is in the affirmative, as it would be with respect to Rule 1, processor 14 accesses the lists database 22 at step 50. Then at step 52, the processor 14 incorporates each data entry contained within the dynamic list into the particular front-end compliance rule referring thereto. At step 54, processor 14 then determines whether the investment request violates any one of the dynamic compliance rules related to Portfolio A.

If the answer to the inquiry at step 48 is in the negative, in that a rule does not include a reference to a dynamic list, i.e., the data string representing the compliance rule does not include a list name, as it would with respect to Rule 2, the processor 14 proceeds directly to step 54, disregarding the subroutine of steps 50 and 52.

At step 54, the processor 14 determines whether the investment request violates any compliance rule related to Portfolio A. In accordance with the present invention, if the processor 14 determines that an investment request violates a compliance rule, the system 10 will provide an indication of non-compliance at step 56 by way of output device 18. In this regard, the output device 18 would readily incorporate the use of email, facsimile transmissions, a graphical user interface, a physical printout, telephone and text messaging or any combination thereof to report the results of the compliance review.

In the instant case, with respect to Rule 1, processor 14 would determine that the Investment Request 1 is in violation of Front-End Dynamic Compliance Rule 1, because Rule 1 restricts purchases of corporate bonds issued by any of the "Tobacco Companies" such as Phillip Morris Corporation. Alternatively, if the processor 14 determines that an investment request is not in violation of a front-end compliance rule, the system 10 will provide an indication of compliance at rule 58 by way of output device 18.

In the instant case, with respect to Rule 2, processor 14 will determine that Investment Request 1 is not in violation of Front-End Static Compliance Rule 2 because, as shown in FIG. 2, the purchase would not cause the value of BBB rated securities in Portfolio A to exceed 10% of the total assets of Portfolio A. More specifically, since the value of BBB rated securities presently within Portfolio A is about $100,000 or about five percent (5%) of the total assets, the addition of 5,000 BBB rated bonds having a value of $50,000 would not exceed ten percent (10%) of the total assets of Portfolio A. Rather, upon executing the trade, Portfolio A would contain about $150,000 of BBB rated bonds, or about seven percent (7%) of the total assets of the portfolio. Nevertheless, because this investment request is in violation of at least one other rule, namely Rule 1, the portfolio manager will be unable to execute the trade, and would be so notified as to the basis thereof by way of output/reporting device 18.

Figure 4:
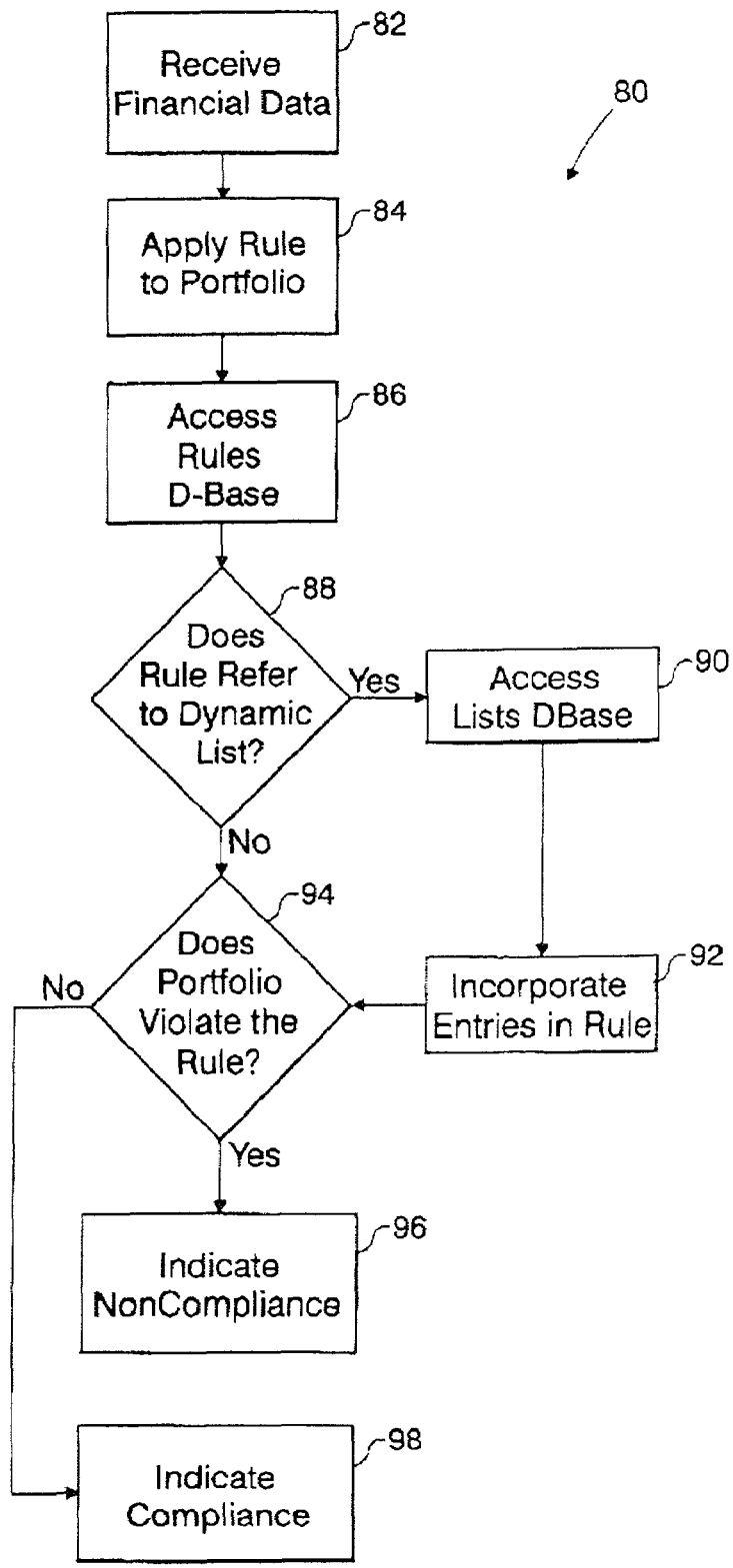
FIG. 4 is a flow chart illustrating the iterative process steps supporting a Front-End Compliance check based on a preferred embodiment of the subject invention

Referring now to FIG. 4, there is illustrated a process flow chart 80 depicting operational steps employed in the method of the present invention to perform a back-end compliance check upon a portfolio of investments, such as Portfolio A of FIG. 2. The back-end compliance process 80 begins at step 82 where financial information is received by input device 16 from an external source of financial reporting. Such information may include, for example, changes in short and/or long term interest rates, exchange rates, or credit ratings for various fixed income securities.

At step 84 the processor 14 applies one or more compliance rules related to Portfolio A from rules database 20 to the Portfolio. This is accomplished by accessing the rules database 20 at step 86. The following are examples of compliance rules relating to Portfolio A that are written in a syntactic format, although one skilled in the art will readily appreciate that the rules may be easily translated into a computer readable expression:

Rule 3 (Back-End Dynamic Compliance Rule)

All "Technology Issues" in Portfolio A Must Maintain a AAA Credit Rating by S&P.

Rule 4 (Back-End Static Compliance Rule)

Securities Rated BBB by S&P Cannot Exceed 10% of the Total Assets of Portfolio A.

At step 88 the processor 14 determines whether any of the back-end compliance rules in database 20 that relate to Portfolio A contain a reference to a dynamic list stored within the list database 22. An example would be the list name "Technology Issues" as included in Rule 3 above and set forth below in Table 2.0.

TABLE 2.0

| List Database |
| --- |
| Technology Issues |
| Advanced Micro Devices |
| Cisco Systems Inc. |
| Lucent Technologies Inc. |
| Micron Technologies Inc. |
| Microsoft Corporation |

With continuing reference to FIG. 4, if the answer to the inquiry at step 88 is in the affirmative, processor 14 accesses the dynamic database 22 at step 90 and incorporates by reference each data entry contained within the dynamic list into the particular back-end dynamic compliance rule referring thereto at step 92. The processor 14 then determines whether Portfolio A, as a whole, violates any back-end compliance rules relating thereto, at step 94.

If the answer to the inquiry at step 88 is in the negative, in that a back-end compliance rule does not include a reference to a dynamic list, i.e., the data string representing the compliance rule does not include a list name, then the processor 14 proceeds directly to step 94, disregarding the subroutine defined by steps 90 and 92.

At step 94, the processor 14 determines whether any backend compliance rule related to Portfolio A is violated. If processor 14 determines that Portfolio A violates a back-end compliance rule, the system 10 will provide an indication of non-compliance at step 96, and preferably the corresponding basis of non-compliance. Alternatively, if the processor 14 determines an absence of violations, the system 10 will provide an indication of compliance at rule 98. In either case, these indications will be communicated to an interested party by way of output device 18.

In the instant case, processor 14 would determine whether Portfolio A, as a whole, is in compliance with dynamic back-end compliance Rule 3 by ensuring that all listed "Technology Issues" contained within Portfolio A have a AAA credit rating. The answer in this case would be in the affirmative since each technology issue in the portfolio of FIG. 2 has a sufficient credit rating from S&P. However, if the credit rating of any technology issue within the list and within the portfolio was downgraded by S&P, the system would provide an indication of non-compliance. It is envisioned that the back-end compliance check can occur at a predetermined time or at preset time intervals during the course of a day. With respect to static back-end compliance Rule 4, processor 14 would determine that Portfolio A remains in compliance as less than five percent (5%) of the assets in the portfolio are BBB rated securities (i.e., Georgia Power Company).

It is envisioned that a compliance rule could serve both as a front-end and a back-end compliance function. For example, Rules 2 and 4 are identical and relate to front-end and back-end compliance.

It is well known in the art, that each financial instrument, and in particular, each fixed income security is identified by a nine-digit CUSIP identifier (see, FIG. 2). The CUSIP identifier may be used to designate, among other things, the issuer of the security and the type of security issued. Traditionally, the first six digits of the nine-digit CUSIP are used to identify the issuer of the instrument. For example, Citibank may be identified by the six digits "912827".

In accordance with a preferred embodiment of the subject invention, one or more digits in a CUSIP may be represented by a dynamic Boolean search term such as any one of the symbols from the group consisting of ^, * or ~. For instance, in the system of the subject invention, the dynamic expression "^912827" would indicate that a CUSIP begins with the six digits "912827". These dynamic expressions are preferably used in conjunction with the dynamic lists of the subject invention to further enhance the efficiency and applicability of the compliance system 10 disclosed herein.

By way of example, an investor, agent, custodian or portfolio manager could specify a front-end dynamic compliance rule which resides in database 20 and reads as follows:

Rule 5 (Front-End Dynamic Compliance Rule)

Limit All Transactions Involving Treasuries for Portfolio A to "Preferred Issuers"

In this instance, the compliance rule limits transactions for Treasuries to certain preferred issuers of securities and the list name or reference "Preferred Issuers" relates to a dynamic list of related dynamic entries stored in database 22, which is set forth below in Table 3.0

TABLE 3.0

| List Database |
| --- |
| Preferred Issuers |
| ^912827 |
| ^313124 |
| ^568890 |
| ^867840 |

In use, referring to FIG. 3, when an investment request, such as Investment Request 2 defined below, is entered into the system 10 at step 42 by way of input device 16, and the investment request contains a nine-digit CUSIP identifier, Rule 5 is applied by the processor 14 at step 44 by accessing it from the rules database 20 at step 46.

Investment Request 2

Purchase 100,000 Treasury Notes Identified by the CUSIP 912827123.

Since Rule 5 contains the dynamic reference "Preferred Issuers", processor 14 accesses the appropriate dynamic list from database 22 at step 50, and incorporates each of the entries listed therein into Rule 5 at step 52, either sequentially or in total. This dynamic rule is then applied against the investment request at step 54 to determine, in this case, whether Investment Request 2 involves one of the "Preferred Issuers". The system then indicates whether Investment Request 2 is in compliance with Rule 5 at steps 56, 58 by way of output device 18. In the instance case, the investment request is compliant as it involves a preferred issuer of U.S. Treasuries.

It is readily apparent that the "Preferred Issuers" list in database 22 can be easily modified to add or delete entries without effecting compliance Rule 5. This would be particularly effective when an issuer such as CITIBANK acquires another issuer of securities. In such an instance, where CITIBANK had previously been one of the "Preferred Issuers" for a portfolio, the institution it acquired would necessarily become a Preferred Issuer and could easily be added to the dynamic list within the dynamic list database 22.

It is also envisioned and well within the scope of the present invention, that a dynamic list stored within database 22 can include, as entries, list names referring to other dynamic lists within database 22. Accordingly, two or more dynamic lists could be linked to one another to further enhance the effectiveness of the compliance system disclosed herein. It is further envisioned that a single rule within rules database 20 can include references to a plurality of dynamic lists stored within database 22.

In general, the subject invention is directed to a method of performing a specified task based upon an instructional statement submitted to a computerized portfolio management system. The basic method includes the step of providing an instructional statement relating to the performance of a specified task, wherein the instructional statement includes a reference to a dynamic database containing a plurality of related entries. The method further includes the steps of accessing the dynamic database, incorporating each of the related entries in the dynamic database into the instructional statement, and applying the instructional statement to perform the specified task.

It is envisioned that the instructional statements can define a variety of different tasks relating to the management of a portfolio of financial instruments. For example, as in the process depicted in FIG. 3, the instructional statement can define a compliance rule pertaining to an investment objective, and the application of the instructional statement would include the step of determining whether an investment request relating to a financial instrument is in compliance with an investment objective.

Alternatively, the instructional statement can define spread pricing criteria for an investment in a financial instrument, and the application of the instructional statement would include the step of determining credit spread risk relating to the investment. The spread pricing criteria would define the nominal credit spread risks, i.e., the difference between yield-to-maturity of an instrument and that of its benchmark. The instructional statement could refer to dynamic databases containing lists of related entries such as, for example, benchmarks, curves or speeds.

In another instance, the instructional statement could define report generating criteria relating to a portfolio of financial instruments, and the application of the instructional statement would include the step of generating a portfolio report based upon the report generating criteria. In such a case, the instructional statement could refer to dynamic databases containing lists of related entries such as, for example, industry sectors, classes of assets, transaction type, names of traders, groups of brokers or sets of benchmarks which define plural fields in a portfolio report.

In yet another instance, the instructional statement could define trade routing criteria relating to a transaction involving a financial instrument, and the application of the instructional statement would include the step of routing information relating to a transaction involving a financial instrument to designated parties interested in the transaction. In such a case, the instructional statement could refer to dynamic databases containing lists of related entries such as, for example, names of traders, brokers or custodian banks which facilitate the transfer of trade information to plural parties interested in a transaction.

Although the system and method of the subject invention have been described with respect to preferred embodiments, those skilled in the art will readily appreciate that changes and modifications may be made thereto without departing from the spirit and scope of the subject invention as defined by the appended claims.

What is claimed is:

1. A method of determining whether a transaction involving a financial instrument is in compliance with investment objectives associated with an investment portfolio, the method comprising the steps of:
   a) providing at least one rule pertaining to an investment objective, the at least one rule including a reference to a dynamic database, the dynamic database containing a plurality of entries related to at least one rule;
   b) receiving an investment request regarding a transaction involving a financial instrument;
   c) accessing the dynamic database and incorporating each of the related entries contained in the dynamic database into the at least one rule;
   d) determining whether the investment request complies with the at least one rule and
   e) communicating the results of step (d) to a user via an output device.

2. A method according to claim 1, wherein the step of incorporating each of the related entries into the at least one rule includes referring to a dynamic list stored within the dynamic database.

3. A method according to claim 2, further comprising the step of providing at least one dynamic entry in a dynamic list stored within the dynamic database.

4. A method according to claim 1, further comprising the step of storing the at least one rule is a rules database.

5. A method according to claim 1, further comprising the step of receiving the investment request from an interested party.

6. A method according to claim 1, further comprising the step of reporting, to an interested party, whether the investment request complies with the at least one rule.

7. A method according to claim 1, wherein the step of determining whether the investment request complies with the at least one rule is self-executing.

8. A method according to claim 1, further comprising the step of modifying the dynamic database.

9. A method of determining whether an investment portfolio is in compliance with investment objectives, the method comprising the steps of:
   a) providing at least one rule pertaining to an investment objective, the at least one rule including a reference to a dynamic database, the dynamic database containing a plurality of related to the at least one rule;
   b) receiving a request to apply the at least one rule to the investment portfolio;
   c) accessing the dynamic database and incorporating each of the related entries contained in the dynamic database into the at least one rule;
   d) determining whether the investment portfolio complies with the at least one rule and
   e) communicating the results of step (d) to a user via an output device.

10. A method according to claim 9, wherein the step of incorporating each of the related entries into the at least one rule includes referring to a dynamic list stored within the dynamic database.

11. A method according to claim 9, further comprising the step of storing the at least one rule in a rules database.

12. A method according to claim 9, further comprising the step of receiving financial data relating to financial instruments contained in the investment portfolio.

13. A method according to claim 9, further comprising the step of reporting, to an interested party, whether the investment portfolio complies with the at least one rule.

14. A method according to claim 9, wherein the step of applying the at least one rule to the investment portfolio is executed by an interested party.

15. A method according to claim 9, wherein the step of applying the at least one rule to an investment portfolio is self-executing.

16. A method according to claim 9, further comprising the step of modifying a dynamic list stored within the dynamic database.

17. A method according to claim 11, further comprising the step of providing at least one dynamic entry in a dynamic list within the dynamic database.

18. A system for determining whether a transaction involving a financial instrument is in compliance with investment objectives associated with an investment portfolio, the system comprising:
   a) a memory storing: i) at least one rule pertaining to an investment objective, the at least one rule including a reference to a dynamic list; and ii) a dynamic list containing a plurality of entries related to the at least one rule; and
   b) a processor in communication with the memory and configured to: i) apply the at least one rule to an investment request regarding a transaction involving a financial instrument by referring to the dynamic list, and incorporating each related entry contained in the dynamic list into the at least one rule; and ii) determine whether the investment request is in compliance with the at least one rule, and
   c) an output device interfacing with the processor and displaying to a user whether the investment request is in compliance with the at least one rule.

19. A system as recited in claim 18, further comprising means for receiving an investment request from an interested party.

20. A system as recited in claim 18, further comprising means for reporting whether an investment request complies with the at least one rule.

21. A system as recited in claim 18, further comprising means for modifying a dynamic list.

22. A system as recited in claim 18, wherein the dynamic list includes at least one dynamic entry.

23. A system for determining whether an investment portfolio is in compliance with investment objectives, the system comprising:
   a) a memory storing: i) at least one rule pertaining to an investment objective, the at least one rule including at least one reference to a dynamic list; ii) a dynamic list containing a plurality of entries related to the at least one rule; and
   b) a processor in communication with the memory and configured to: i) apply the at least one rule to the investment portfolio by referring to the dynamic list to incorporate each entry contained in the dynamic list into the at least one rule; and ii) determine whether the investment portfolio complies with the at least one rule, and
   c) an output device interfacing with the processor and displaying to a user whether the investment request is in compliance with the at least one rule.

24. A system as recited in claim 23, further comprising means for reporting whether an investment portfolio complies with the at least one rule.

25. A system as recited in claim 23, further comprising means for modifying a dynamic list.

26. A system as recited in claim 23, wherein a dynamic list includes at least one dynamic entry.

* * * * *

UNITED STATES PATENT AND TRADEMARK OFFICE
CERTIFICATE OF CORRECTION

| | | |
|---|---|---|
| PATENT NO. | : 7,403,918 B2 | Page 1 of 1 |
| APPLICATION NO. | : 10/086769 | |
| DATED | : July 22, 2008 | |
| INVENTOR(S) | : Joseph M. Kochansky | |

It is certified that error appears in the above-identified patent and that said Letters Patent is hereby corrected as shown below:

Column 10, line 54, "plurality of related" should be changed to --plurality of entries related--.

Signed and Sealed this

Thirteenth Day of January, 2009

JON W. DUDAS
*Director of the United States Patent and Trademark Office*